Dec. 2, 1969 E. L. A. MAYEAUX 3,481,458
HOLDER FOR FOOD
Filed Oct. 10, 1967
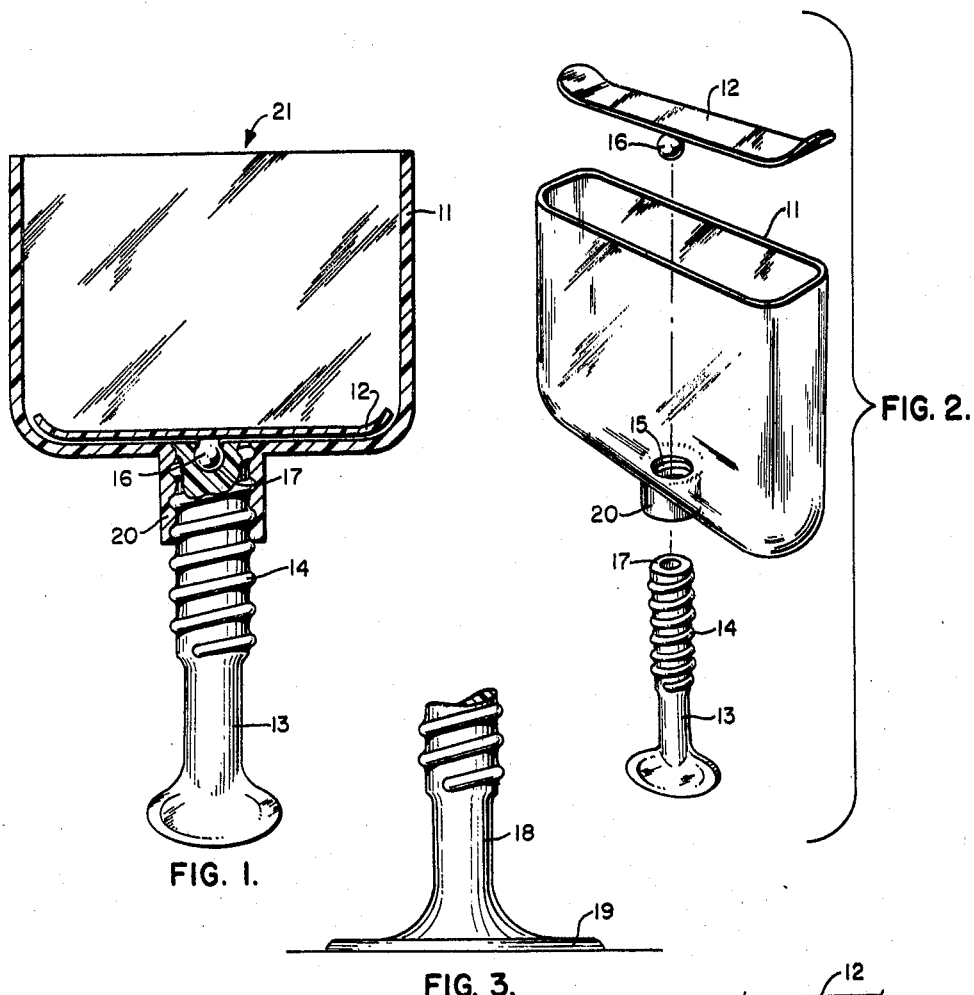
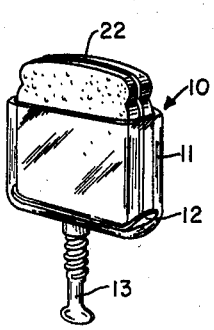
INVENTOR.
EMMA LEE A. MAYEAUX
BY N. Elton Dry
ATTORNEY United States Patent Office 3,481,458
Patented Dec. 2, 1969

3,481,458
HOLDER FOR FOOD
Emma Lee A. Mayeaux, Rte. 1, Box 136W,
Gonzales, La. 70737
Filed Oct. 10, 1967, Ser. No. 674,196
Int. Cl. B65d *83/00, 25/10*
U.S. Cl. 206—56                    2 Claims

ABSTRACT OF THE DISCLOSURE

An article of manufacture for holding sandwiches, hamburgers and the like comprising an elongated, cup-like container, a handle threaded on one end, the handle being inserted within the closed end of the container, a strip of rigid material generally conforming in shape to the closed end of the container and being freely movable therein and having a ball extending downwardly from the lower side thereof and connected to the upper end of the inserted handle, the handle and strip configuration providing a means for raising and lowering a sandwich that has been placed in the container.

BACKGROUND OF THE INVENTION

Field of the invention

The present invention relates to a container or holder for food such as a sandwich, hamburger or a frankfurter generally referred to as a hot dog.

Description of the prior art

When a person holds a sandwich while eating same he is often confronted with the problem of preventing the sandwich from falling apart. This is especially true with young children, not to mention the usually accompanying dripping of juices, spreads, and the like. When paper is wrapped around the sandwich, these juices and drippings usually cause the paper to disintegrate before eating of the sandwich is complete.

U.S. 3,094,264 describes a tray-like holder for drinks and sandwiches, but does not solve the problem of preventing a sandwich from coming apart while actually being consumed. The holder for food, hereinafter described, overcomes these and attendant problems related to the eating of sandwiches and the like.

SUMMARY OF THE INVENTION

An article of manufacture for holding food comprising, in combination, a resilient, rectangularly shaped cup-like container, open at one-end thereof and closed at opposite end, having at the opposite, closed end a centrally located round opening, said opening extending downwardly through a slight protrusion from the closed end of the container, said protrusion adapted to receive a section of rod, said rod being upwardly and downwardly movable when inserted within the protuberance, and having an opening in the insertable end of the rod for receiving a ball, and an elongated strip generally conforming to the shape of a closed end of the container, said strip having a ball extending downwardly from one side thereof, the ball being received within the inserted end of the rod forming a ball and socket relationship, which when engaged permits the strip to be raised and lowered within the container.

DESCRIPTION OF THE PREFERRED EMBODIMENTS

The invention will be more readily understood from a reading of the following specification and by reference to the accompanying drawings wherein an example of the invention is shown, and wherein:

FIGURE 1 is a side elevational view of the construction of the holder with a portion thereof cut away to illustrate the structural details of the invention in assembled condition;

FIGURE 2 is an exploded schematic perspective view of the holder illustrating the relation of the separate parts thereof;

FIGURE 3 is a side elevational view of a portion of the handle having a standing base configuration;

FIGURE 4 is a perspective view of the holder having a sandwich inserted therein; and FIGURE 5 is a side elevational view of a portion of the handle and strip with a portion broken away to illustrate the ball and socket relationship thereof.

In the drawings illustrating the invention, like numerals refer to like parts throughout. Referring specifically to the drawings, the numeral 21 generally designates the food holder of the present invention for the purpose of holding a sandwich, hamburger or other like food material 22. The food holder 21 is specifically adapted to hold a sandwich 22 in a position so that at least one-third of the sandwich 22 protrudes above the upper edge of holder 21 when the sandwich 22, supported on strip 12, is lowered to the bottom of holder 21. As the upper portions of the sandwich 22 are eaten, the handle 13 is rotated, said rotation causing the elevation of strip 12 upwardly in holder 21. This action furnishes additional sandwich 22 to be presented to the person using holder 21.

Referring now specifically to FIGURE 2, there are shown the three component parts of the invention. These parts comprise the elongated, rectangular, cup-like holder 11, or sandwich receptacle; the handle or base 13; and the strip 12 with ball 16 attached thereto. The receptacle 11 has an opening 15 located at the bottom of the closed end of the receptacle 11. The opening 15 extends downwardly through a slight protruberance 20 extending downwardly from the closed end of the receptacle 11.

The handle 13 preferably has a threaded portion 14 which engages the matching thread grooves within opening 15. Rotation of handle 13 causes the handle 13 to move in an upward direction within receptacle 11. The handle can be of any configuration and length in conformance with the intended use of the holder 11.

FIGURE 3 illustrates one possible variation of handle 13, wherein the stem 18 ends in a fluted base 19. This enables the holder 11 to be placed upon an essentially flat surface in an independently, standing position. It is understood that no particular configuration is deemed critical to the invention. The configuration is preferably dependent on the end-use desired for the article of the invention.

In FIGURE 2, the strip 12 is shown in disassembled relation to the receptacle 11. The holder 21 of FIGURE 1 may be taken apart for cleaning, as shown in FIGURE 2. Ball 16 of strip 12 normally may be snapped into the socket 17, forming a ball and socket connection.

The ball and socket relation is better illustrated in FIGURE 5. The material from which holder 21 is made is preferably a resilient material. This allows slight expansion of the socket 17, allowing ingress and egress of ball 16. When in use, holder 21 provides for raising and lowering strip 12 by rotation of handle 13. Due to the ball 16 and socket 17 arrangement, the strip 12 is raised as handle 13 is rotated in a normal clockwise direction.

FIGURE 1 illustrates holder 21 in assembled condition. Handle 13 is shown possessing a key-type shape. Strip 12 is shown in its lower-most position, situated to receive a sandwich of normal proportions. FIGURE 4 better illustrates receptacle 11 with a sandwich resting on strip 12. As handle 13 is rotated and moves upwardly, strip 12 affords support for the sandwich 22.

Juices and the like dripping from the sandwich 22 can pass over strip 12 and collect in the bottom of receptacle 11.

The threads 14 shown in FIGURE 1 can be spaced as far apart as is desired. There is illustrated about four threads 14 per inch. Three to four threads 14 per inch are generally preferred, but are not critical.

Strip 12 is preferably not in a touching relationship with the walls of receptacle 11. There is provided room between strip 12 and receptacle 11 for juices and other fluids and drippings to pass therebetween.

The holder 21 may be made from any resilient material that can withstand temperatures sufficiently high to sterilize the holder 21. However, if desired, the holder 21 may be made from light-weight, inexpensive materials where the holder 21 is to be discarded after a single use. Materials for use can be selected from plastics, paper products, or metals. If metals are used, the ball and socket must be adapted to allow engagement of the ball 16 within socket 17.

Preferably, if plastics are to be used, they should have a heat deflection temperature above about 80° C. Many suitable moderate to high-temperature plastics are available commercially for this purpose.

The material should also have at least a moderate impact resistance. Good flex modulus and tensile strengths are also preferred in selecting a suitable material for use in making holder 21. Receptacle 11 and handle 13 may be extruded or blow-molded, if plastics are to be used. No particular method of forming component parts of holder 21 is preferred. Light-weight and inexpensive holders 21 may be produced with little difficulty by forming receptacle 11 and handle 13 by blow-molding methods well known in the art. Extrusion techniques may be employed, also.

The foregoing description of the invention is explanatory thereof and various changes in size, shape, and materials, as well as in the details of the illustrated construction may be made without departing from the spirit of the invention.

What is claimed is:

1. An article of manufacture for holding food comprising, in combination, a resilient, rectangularly shaped cup-like container, open at one end thereof and closed at the opposite end, having at the opposite, closed end a centrally located opening, said opening being adapted to receive a section of rod, said rod being upwardly and downwardly movable when inserted within the opening, the non-inserted end of the rod having a fluted configuration, said fluted end being capable of supporting the article in a standing position when placed upon a relatively flat surface, the inserted end of the rod having an opening for receiving a ball, and an elongated strip positioned within the container, said strip generally conforming to the shape of the closed end of the container, said strip having a ball extending downwardly from one side thereof, the ball being received within the inserted end of the rod forming a ball and socket relationship, which when engaged permits the strip to be raised and lowered within the container by raising and lowering the inserted rod base within said container opening.

2. The article of claim 1 wherein the section of rod is threaded on the insertable end thereof, the threaded end containing a socket for receiving a ball, and the cup-like container having a protuberance extending downwardly from the closed end thereof at the centrally located opening in the closed end of the container, said opening extending vertically through the protuberance and being circular in cross-section, opening into said container, the walls of the passageway, defining the opening, being threaded to receive the threaded end of said section of rod.

References Cited

UNITED STATES PATENTS

| 345,295 | 7/1886 | Forchheimer | 206—56 |
|---|---|---|---|
| 658,583 | 9/1900 | Pridmore | 100—289 |
| 1,688,148 | 10/1928 | Martin | 248—229 |
| 1,701,788 | 2/1929 | Metters et al. | 206—56 |
| 1,896,463 | 2/1933 | Offerman | 220—93 |
| 2,166,619 | 7/1939 | Becker | 206—56 |

WILLIAM T. DIXSON, JR., Primary Examiner

U.S. Cl. X.R.

220—93: 248—229